United States Patent [19]
Murto et al.

[11] 3,811,412
[45] May 21, 1974

[54] POULTRY FEEDER

[75] Inventors: Robert A. Murto, Goshen; Eldon Hostetler, Middlebury, both of Ind.

[73] Assignee: Chore-Time Equipment, Inc., Milford, Ind.

[22] Filed: Sept. 27, 1972

[21] Appl. No.: 292,614

Related U.S. Application Data
[63] Continuation of Ser. No. 74,381, Sept. 22, 1970, abandoned.

[52] U.S. Cl. ............................................. 119/53
[51] Int. Cl. ........................................... A01k 05/00
[58] Field of Search ................. 119/53, 52 R, 52 AF

[56] References Cited
UNITED STATES PATENTS

| | | | |
|---|---|---|---|
| 3,408,988 | 11/1968 | Lee | 119/53 |
| 2,163,186 | 6/1939 | Bergeron | 119/53 |
| 1,666,322 | 4/1928 | West | 119/52 R |
| 3,388,690 | 6/1968 | Hostetler | 119/53 |

*Primary Examiner*—Hugh R. Chamblee
*Attorney, Agent, or Firm*—Olson, Trexler, Wolters & Bushnell

[57] ABSTRACT

A poultry feeding apparatus is disclosed herein and includes a central feed conveyance tube for directing feed to a plurality of feed dispensing assemblies which are suspended at spaced intervals along the feed conveyance tube. Each dispensing assembly comprises a hollow feed distributing member adapted to be rotatably secured to and depend from the conveyance tube for receiving feed therefrom, a pan disposed beneath the distributing member for receiving the feed therefrom, a hood disposed around and connected to the distributing member, and a plurality of spoke elements securing the pan to the hood.

5 Claims, 6 Drawing Figures

PATENTED MAY 21 1974

Inventors
Robert A. Murto
Eldon Hostetler
By: Olson, Trexler, Wolters & Bushnell attys

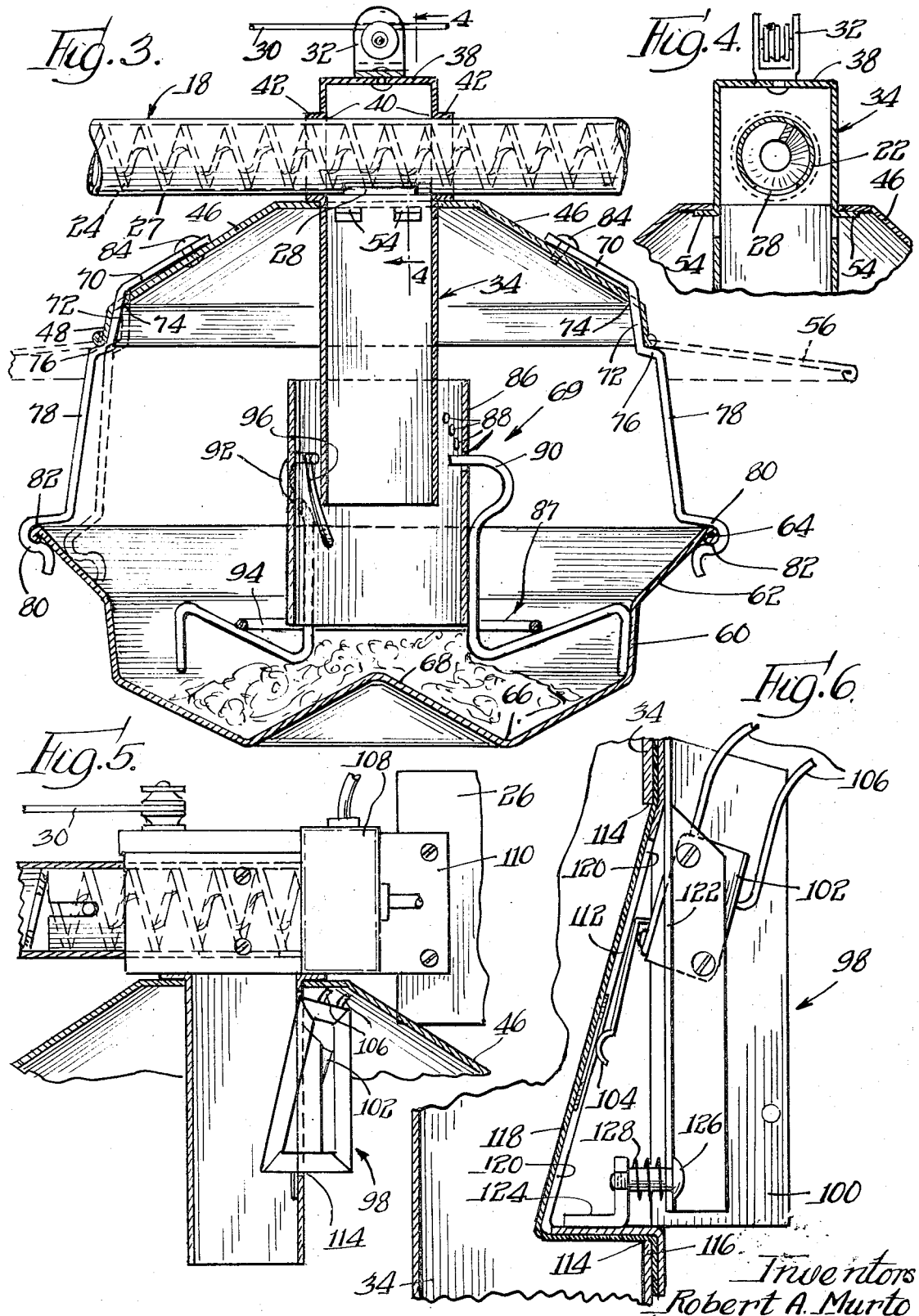

POULTRY FEEDER

REFERENCE TO OTHER APPLICATIONS

This is a continuation application of copending application Ser. No. 74,381, filed Sept. 22, 1970, now abandoned.

SUMMARY OF THE INVENTION

The present invention relates generally to feeding devices, and more particularly to devices for feeding a large number of turkeys or other large poultry.

DISTINCTIONS OVER THE PRIOR ART AND OBJECTS

Poultry feeders of the general type contemplated herein are well known and usually comprise a feed conveyor of sorts which directs feed to a plurality of dispensing pan assemblies located along the conveyor. Each of the assemblies includes a dispensing pan for receiving the feed and making the same available to the poultry.

While the aforesaid type of feeder apparatus has been successful when used for feeding chickens or other species of poultry which are relatively small and weak, problems have been encountered when such an apparatus is used to feed large numbers of turkeys or other large and stronger members of the poultry family. Specifically, this type of apparatus is not constructed nor equipped to withstand the abuse which is necessarily exerted by these larger and stronger members.

Accordingly, an important general object of the present invention is to provide an apparatus for feeding a large number of turkeys or other relatively large and strong members of the poultry family, which apparatus is constructed and equipped in a rugged and reliable manner so as to withstand the necessary abuse which is exerted by such birds.

Another object of the present invention is to provide a feed dispensing assembly of the above-described type displaying a new and improved hood member constructed so as firstly to prevent poultry from roosting thereon, and secondly, to prevent the environmental elements such as rain and dust from contaminating the feed.

Still another object of the present invention is to provide a feed dispensing assembly of the above-described type including a new and improved dispensing pan constructed so as to minimize feed waste.

Yet another object of the present inventioon is to provide a feed dispensing assembly of the above-described type utilizing a plurality of new and improved spoke members which are fashioned and positioned in such a manner so as to more rigidly secure the individual components of the assembly together.

Still another object of the present invention is to provide a feed dispensing assembly of the above-described type having a new and improved feed distributing member which is more rugged than those found in the prior art and which substantially eliminates damage to the feed conveyance tube connected thereto.

These and other objects and features of the invention will become more apparent from a reading of the following descriptions.

BRIEF DESCRIPTION OF THE DRAWINGS

In the Drawings:

FIG. 3 is a sectional view taken generally along line 3—3 in FIG. 2;

FIG. 4 is a partial sectional view taken generally along line 4—4 in FIG. 3;

FIG. 5 is a blown up sectional view taken generally along line 5—5 in FIG. 1, and specifically showing a limit switch assembly utilized with one of the feed dispensing assemblies of FIG. 1; and, FIG. 6 is a blown up partial side sectional view of the limit switch assembly of FIG. 5.

DETAILED DESCRIPTION

Figure 1:
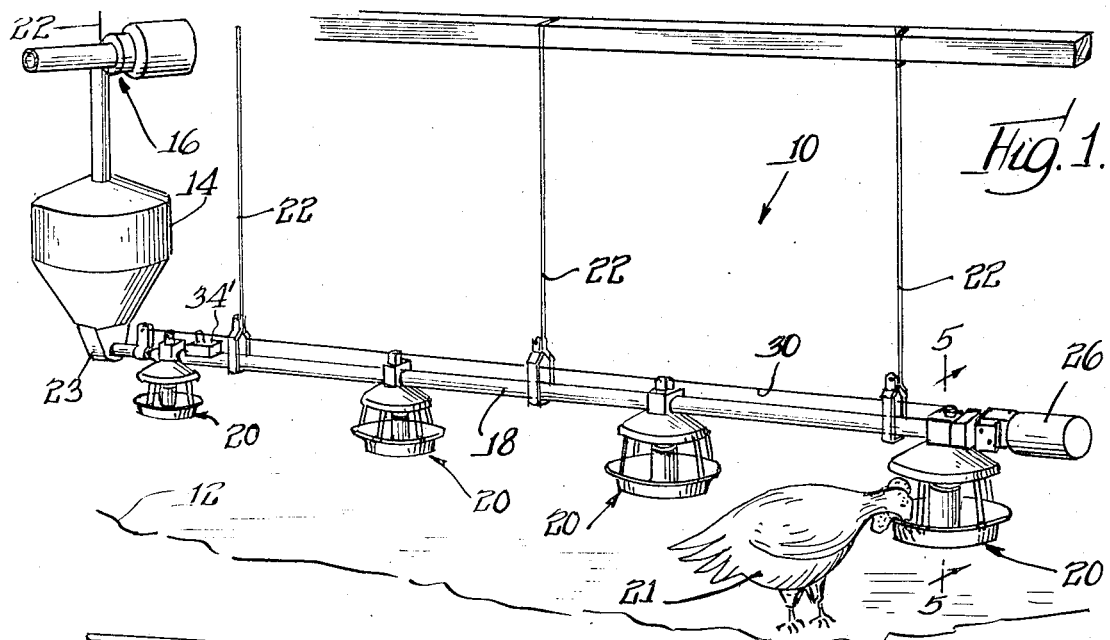
FIG. 1 is a fragmentary perspective view showing a feeder apparatus incorporating features of the present invention.

Referring now more specifically to the drawings wherein like parts are designated by the same numerals throughout the various figures, a feed apparatus 10 incorporating features of the present invention is shown in FIG. 1 installed in a suitable building 12. In general, the apparatus 10 comprises a hopper 14 which may be filled with feed manually or may be supplied by a suitable distribution system, as generally indicated by the reference numeral 16. The hopper 14 is connected to a horizontally extending feed conveyance tube 18 from which a plurality of feed dispensing assemblies 20, constructed in accordance with the present invention are suspended at spaced intervals, the assemblies making feed available to turkeys or other members 21 of the poultry family.

For reference purposes, the left-hand end of conveyance tube 18, as viewed in FIG. 1, will be designated hereinafter as the upstream end while the right-hand end will be designated as the downstream end. With this in mind, it should be noted that all of the feed dispensing assemblies are identical with the exception of the assembly positioned at the downstream end. This assembly is used to limit the amount of feed distributed through the conveyance tube in a manner to be described in detail with respect to FIGS. 5 and 6. The hopper 14 and feed conveyance tube 18 are held in place preferably by a plurality of cables 22 which extend from the roof of the building and which are suitably connected at their free ends to the hopper and conveyance tube.

Referring to FIG. 3, the feed conveyance tube 18 comprises a conduit or cylindrical tube 27 extending from a connection with a fitting 23 at the lower end of the hopper 14 and in a substantially straight line. It is to be understood that the length of the tube may be adjusted or varied in accordance with the size of the poultry house and number of pan assemblies involved. In general, the tubes will extend substantially throughout the length of the poultry house. A centerless auger or screw conveyor 24 is rotatably disposed within the conduit or tube 27 for delivering feed from hopper 14 to the individual pan assemblies 20. The upstream end of the auger is preferably anchored by a suitable bearing unit (not shown) mounted in the fitting 23, while the opposite or downstream end of the auger is secured to the output drive shaft of an electric motor and speed reducing unit 26 which is suitably connected with a source of electric power (not shown).

The tube 22 is preferably provided in relatively short lengths telescopically joined together. At spaced intervals along the length of the conveyor, the tube 22 is formed with discharge openings 28 in the lower side thereof, as best seen in FIG. 4, which openings register with the feed dispensing assemblies 20 and 20a, in a manner to be described in more detail hereinafter.

In order to prevent the turkeys or other poultry from perching on feed conveyance tube 18, an electrified wire 30 is provided above and extends the length of the conveyance tube. The wire, which is supported by a plurality of insulating members 32 mounted to assemblies 20, receives its current from a power source (not shown) through a step-down transformer 34' mounted to and at the upstream end of the feed conveyance tube or at any other convenient location.

Figure 2:
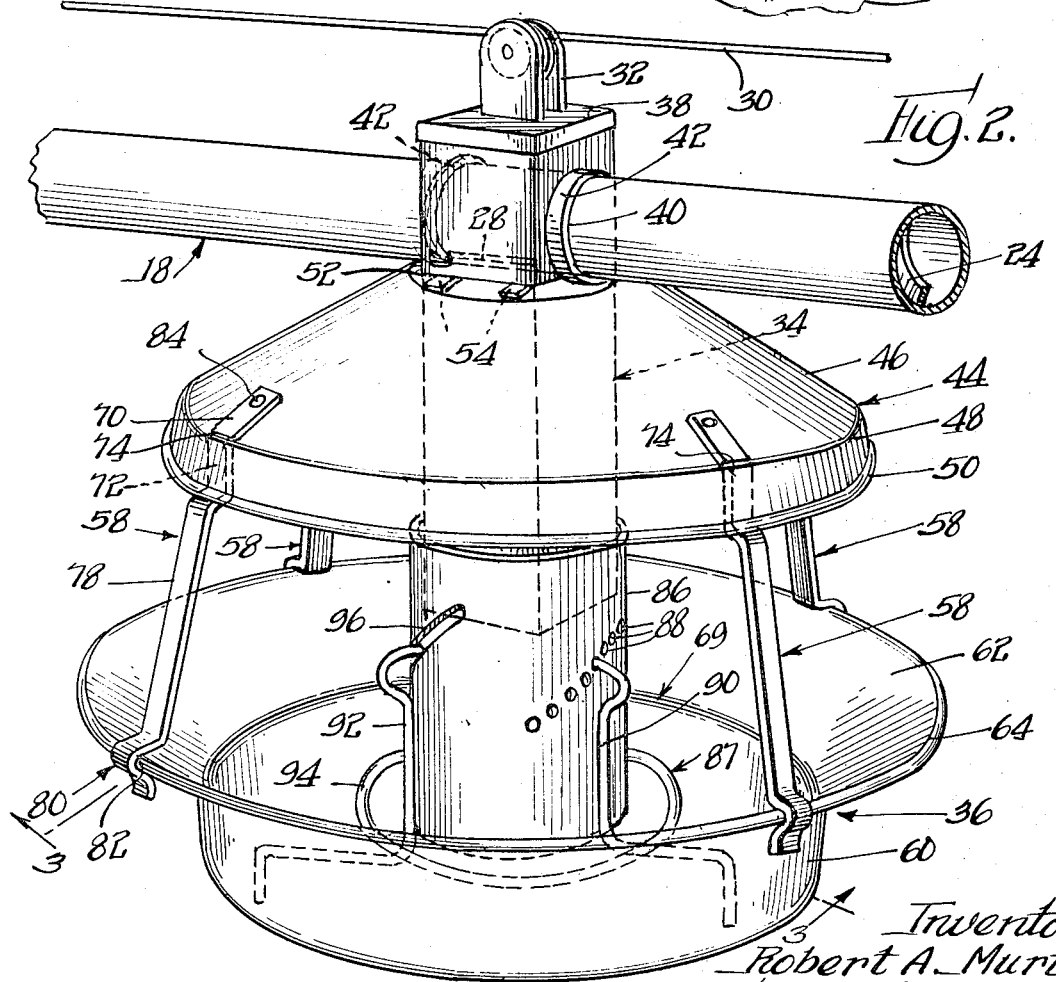
FIG. 2 is a perspective view of one of a plurality of feed dispensing assemblies which is constructed in accordance with the present invention and which is used with the feeder apparatus of FIG. 1.

Referring now to FIGS. 2 and 3, each of the feed dispensing assemblies 20 includes a hollow, elongated feed distributing member 34 which is rotatably supported to and which depends from the feed conveyance tube 18 directly over an aperture 28. The member is provided for directing a portion of the feed from the conveyance tube, through aperture 28, and to a dispensing pan member or tray 36 which is disposed directly beneath the feed distributing member.

The feed distributing member is preferably constructed of two elongated L-shaped steel members having their lengthwise edges welded or otherwise suitably fastened together so as to define a generally rectangular (preferably square) cross-section, as seen best in FIG. 2. The L-shaped members may include suitable overlapping flanges (not shown) for aiding in the securement of the members. The top end 38 of the feed distributing member is capped or otherwise closed and supports an individual insulating member 32.

Two aligned apertures 40 extend through opposite side walls of the feed distributing member and are suitably dimensioned or slidably receiving the feed conveyance tube 18 so that the feed distributing member may freely rotate about the longitudinal axis of the feed conveyance tube. In order to prevent the edges of member 34 defining apertures 40 from cutting into conveyance tube 18 as the member rotates about the conveyance tube, two flanged bearings 42 are provided. These bearings, which are cylindrical in shape, extend outwardly from feed distributing members 34 and circumscribe apertures 40 for frictionally engaging the feed conveyance tube in a substantially smooth manner to thereby minimize wear and tear to the latter.

In order to prevent the environmental elements such as dust from contaminating the feed located in pan member 36 and also to prevent turkeys or other poultry from perching within the pan member, a hood 44, preferably constructed of stamped sheet metal, is disposed around the feed distributing member 34 of each feed dispensing assembly 20 and is positioned directly below apertures 40 and a small distance above the pan member. The hood comprises a substantially frusto-conically shaped body portion 46 which diverges downwardly and away from feed distributing member 34. A substantially vertically extending flange portion 48 extends downward from the lower edge of body portion 46 and merges with an out-turning beaded portion 50. The frusto-conical shape of the body portion 46 aids in preventing the turkeys or other poultry from roosting or otherwise climbing onto the hood.

The hood includes, at its top end thereof, a substantially square shaped opening 52 which is dimensioned to snugly receive the similarly shaped feed distributing member 34. Initial assembly is achieved by placing the hood over the top end of member 34 and moving it downward until such movement is arrested by a plurality of flanges 54 which project outwardly from opposite side walls of member 34 and which are positioned directly below apertures 40. The hood is thereafter welded or otherwise suitably fastened to the flanges.

Inn the event that feed apparatus 10 is utilized out of doors, the hood 44 of each feed dispensing assembly 20 may be provided with a skirt member 57 which is connected to and extends horizontally outwardly from the lower edge of flange portion 48 and which completely circumscribes the periphery of the hood. The skirt member is shown in dotted lines in FIG. 3 and as seen there extends a substantial distance beyond the outermost edges of pan member 36 for preventing rain or the like from entering within pan member 36.

Reference is now made to the dispensing pan member or tray 36 which, as stated above, is disposed beneath hood 44 for receiving feed from feed distributing member 34. The pan member, which is rigidly connected to the hood by four elongated spoke members 58 in a manner to be described hereinafter, includes a cylindrical side wall 60 having a diameter substantially equal to or less than the maximum diameter of hood 44. An upper margin of the pan side wall merges with a substantially frusto-conically shaped flange wall 62 which diverges outwardly and away from side wall 60 and which is provided for reasons to be described below. The upper margin of flange wall 62 merges with an out-turned bead 64 which, as will be seen hereinafter, aids in supporting the spoke members 58. The pan member is formed with a bottom initially extending downwardly and inwardly and thence upwardly and inwardly so as to define an annular trough 66 of generally V-shaped transverse cross-section, and a central conical portion 68 which projects upwardly towards the center of feed distributing member 34.

The central conical portion 68 directs feed radially outwardly from within feed distributing member 34 and into trough 66 from which the turkeys or other fowl may eat. The quantity of feed which may be delivered into the trough at any one time may be effectively controlled by a control assembly 69 to be described hereinafter.

The flange wall 62 minimizes feed loss in a manner which is apparent when the feed habits of turkeys are taken into consideration. Specifically, the turkey, as opposed to chickens or certain other members of the poultry family, tends to insert his head within the trough for obtaining the feed, and thereafter he completely withdraws his head and the feed, prior to eating the same. During this procedure, it has been found that a substantial amount of withdrawn feed dribbles from the turkey's mouth. This dribbled feed, which would otherwise fall to the ground and be wasted, is caught by flange wall 62 and directed back into annular trough 66 where it is again made available to the turkeys. In addition, by utilizing spokes 58, it has been found that the turkey is less inclined to withdraw its head than when a grille type pan assembly is used. This, in turn, results in further saving of feed.

As previously indicated, pan member 36 is rigidly connected to hood 44 by four spoke members 58. Each spoke member, which is preferably constructed of rugged but resilient heat-treated spring steel, is formed in the following manner. Starting with the top end, as vieweed in FIG. 3, the spoke member extends downwardly and outwardly for defining a portion 70 to be placed in juxtaposition with the outer surface of body portion 46 of the hood, and thence substantially vertically downwardly so as to define a second portion 72 which passes through a cooperating slot 74 provided in the hood, portion 72 engaging the inner surface of flange portion 48. Thereafter, the lower end of portion 72 merges into an outwardly and slightly downwardly extending portion 76 which engages the bottom side of bead 50 and which extends slightly outside the hood so as to merge with a fourth portion 78. This latter portion is directed downwardly and slightly outwardly away from the hood and terminates slightly above and slightly inside the upper edge of pan member 36, as indicated by dotted lines in FIG. 3. An outwardly extending partially U-shaped clip portion 80 merges with the terminating end of portion 78 and defines an arcuate cavity 82 having a cross-sectional diameter slightly less than that of bead 64.

Each of the spoke members 58 is assembled to the hood 44 and pan member 36 by firstly inserting top portion 70 through cooperating slot 74, from beneath the hood, so that portons 70, 72 and 76 are placed in juxtaposition with body portion 46, flange portion 48 and bead 50, respectively. Thereafter, the top portion 70 is rigidly affixed to body portion 46 by rivets or other suitable fastening means 84. Finally, the spoke member is moved from its position indicated by dotted lines in FIG. 3 to a position slightly outwardly from the upper edge of pan member 36 by deforming portion 78 and pulling the same outwardly beyond the bead 64 of the pan member. The spoke member is then, due to its resiliency, allowed to spring back to its initial undeformed shape so that the clip portion 80 may be snapped around bead 64.

With spoke members 58 constructed and assembled in the aforementioned manner, a majority of the stress, which would otherwise centralize at fastening devices 84, is redirected towards the center of the spoke members, which minimizes the possibility of disengagement. Specifically, due to the resiliency and shape of the spoke members, in conjunction with the manner in which they are assembled to the hood 44, most of the stress resides between portions 72 of the spoke members and flange portion 48 of the hood as well as between clip portion 80 and the bead 64 of pan member 36. Flange portion 48 and bead 50 act as an effective fulcrum for the spoke members.

Returning to FIG. 2, it is to be noted that spoke members 58 are equally circumferentially spaced around pan member 36 and hood 44. In addition, each spoke member lies within a vertical plane which extends at substantially a 45° angle with a second vertical plane extending through the longitudinal axis of feed conveyor tube 18. This type of positioning has the unique advantage of providing two spoke members, as opposed to just one, for substantially eliminating any abrupt movement of the feed pan assembly which might otherwise cause pan member 36 to be disassembled from the lower ends of the remaining spoke members. Specifically, turkeys or other larger and stronger members of the poultry family tend to charge against the front side of feed pan assembly 20, as viewed in FIG. 3, causing the same to want to rotate abruptly around feed conveyance tube 18. However, two rearward spoke members, also as viewed in FIG. 3, tend to counterbalance this charging force so that the feed pan assembly rotates in a rather smooth manner. Therefore, the possibility that the forward spoke members become disassembled from pan member 36 during this charging force is minimized. While four spoke members are shown and described, it is to be understood that the invention contemplates any number thereof so long as the pan member is securely held to the hood.

As previously indicated, the quantity of feed which may be delivered into trough 66 of pan member 36 at any one time is effectively controlled by a control assembly 69, as best seen in FIGS. 2 and 3. The control assembly includes an elongated open-ended feed control cylinder 86 which is preferably constructed of rugged sheet metal and which has a cross-sectional diameter dimensioned so as to circumscribe feed distributing member 34. The cylinder is supported from a feed control cylinder support stand 87 which is constructed in a manner to be described below. The upper end of cylinder 86 is disposed around the lower end of the feed distributing member so that the bottom open end of the cylinder lies in a horizontal plane and is positioned directly above conical portion 68 of pan member 36. The amount of feed which enters the pan member is dependent upon the distance between the bottom open end of the cylinder and conical portion 68. That is, as this distance is increased, by moving the tube upwards with respect to the conical portion, more feed is allowed to pass through the feed distributing member 34 and the cylinder 86 for entering into trough 66 of the pan member. On the other hand, as this distance is decreased, by moving cylinder 86 towards conical portion 68, a majority of the feed tends to build up within the feed distributing member and cylinder and thus decrease the amount delivered to trough 66. In this manner, the level of feed within the pan member will never increase substantially above the lower open end of cylinder 86.

Referring now to the manner in which feed control cylinder 86 is raised and lowered, attention is directed to FIG. 2 which shows the feed control cylinder displaying a plurality of indexing holes 88 arranged in helically spaced relationship. These holes are designed to receive one end of a support leg 90 of the feed control support stand 87, the other end of the support leg extending away from the feed control cylinder and thereafter turned under so as to wedge against side wall 60 of pan member 36, as can best be seen in FIG. 3.

When one end of the support leg 90 is positioned in one of the holes 88, the feed pan control cylinder 86 is positioned vertically relative to the conical portion 68 of the pan member. As stated above, the vertical position of the feed control cylinder 86 relative to the conical portion 68 determines the amount of feed which enters into annular trough 66.

The support stand 87 also includes two other support legs 92 (only one of which is shown) which are identical to support leg 90, and which along with support leg 90 are equally circumferentially spaced around and welded or otherwise secured to a feed saver ring 94. The lower ends of support legs 92 are wedged against side wall 60 of pan member 36 in the same manner as support leg 90, and their upper ends are inserted in respective angular or helical slots 96 which are formed in the feed control cylinder and which, along with the plurality of indexing holes 88, are positioned equally circumferentially around the feed control cylinder.

Since the slots 96 and indexing holes 88 are positioned parallel to each other, the movement of support leg 90 from one hole to another will result in the simultaneous movement of support legs 92 in slots 96. The feed control cylinder 86 may therefore be positioned vertically by merely removing the support leg 90 from its particular indexing hole and placing it in a selected indexing hole which is either above or below its original position.

This particular indexing structure, that is, indexing holes 88 and slots 96, permits the feed control cylinder 86 to be vertically indexed with a minimum amount of effort, since only support leg 90 must be moved from its hole in order to change the vertical position of the cylinder.

The feeder saver ring 94 is connected to each of the feed control support legs, as stated above. This ring prevents poultry from scratching out the feed at the base of the pan member 36 and thus wasting the feed. In addition to positioning the feed saver ring and permitting easier adjustment of the feed control cylinder, the present support means 87 enables the user of the feed pan assembly 20 to tell at a glance what level the feed control cylinder is at. The indexing holes of the feed control cylinder are clearly visible from the side of the feed pan assembly.

As indicated previously, the most downstream feed pan assembly 20 is utilized for limiting the amount of feed distributed through conveyance tube 18. This is accomplished by utilizing a limit switch assembly 98 with this pan assembly, which can best be seen in FIGS. 5 and 6. It is to be understood, of course, that this particular pan assembly may be positioned at any convenient location on the conveyance tube.

The limit switch assembly includes a housing 100 which is supported to a side wall of feed distributing member 34 in a manner to be described below. A conventional limit switch 102 having an actuating arm 104 is mounted within housing 100 and is interlocked to motor and speed reducing unit 26 through a plurality of electrical leads 106 extending through an outlet box 108, the outlet box being connected to the unit 26 by a mounting plate 110.

Housing 100 is welded or otherwise suitably secured to an end plate 112 which extends downwardly and inwardly into feed-distributing member 34 through an opening 114 in the last-mentioned member. The bottom end of end plate 112 includes an L-shaped flange member 116 which, along with the upper end of the end plate is suitably fastened to the external surface of the feed distributing member. A rubber or rubber-like diaphragm 118 is positioned over and secured to the inwardly facing surface of end plate 112. The free end of actuating arm 104 is biased against the diaphragm through a cooperating aperture 120 in the end plate and is movable to the right, as viewed in FIG. 6, for actuating limit switch 102. The precise positioning of limit switch 102 and actuating arm 104 with respect to diaphragm 118 is controlled by a plate 122 which is suitably connected to the limit switch, and which is also connected to a flange 124 through an adjustable screw element 126, the flange being suitably mounted to flange member 116 of end plate 112. The screw element is inserted through an aperture in flange 124 and includes a circumscribed spring member 128 which biases plate 122 against the head of the screw. The exact position of the limit switch and actuator arm is determined by the position of adjustable screw element 126.

Operationally, in the event that feed builds up within feed distributing member 34, which quite often happens when the poultry are not eating the feed, the portion of diaphragm 118 disposed over aperture 120 is forced through the aperture for moving the actuating arm 104 to the right, as viewed in FIG. 6. This in turn actuates limit switch 102 which deenergizes motor and speed reducing unit 26 for shutting down the auger 24 and therefore arresting the movement of feed through feed conveyance tube 18. When the situation is rectified so as to allow the feed to freely move through the feed distributing tube and into pan member 36, the diaphragm 118, due to its resiliency, moves back to its initial position, which in turn allows the actuating arm 104 to do the same. The motor and speed reducing unit is again energized for driving auger 24.

While a preferred embodiment of the present invention has been shown and described herein, it is obvious that many structural details may be changed without departing from the spirit and scope of the appended claims.

The invention is claimed as follows:

1. A feed dispensing assembly for use in a poultry feeding system having elongated feed conveyance means for directing feed to said assembly, said assembly comprising: a hollow feed distributing member adapted to be secured to and depend from said conveyance tube for receiving feed therefrom, said member including aligned apertures extending through opposite walls thereof for receiving said feed conveyance means and flange bearings circumscribing said apertures and engaging said feed conveyance means for rotatably supporting said assembly to said tube; a pan disposed beneath said feed distributing member for receiving said feed and making said feed available to poultry, said pan including a substantially cylindrical base portion of predetermined upper diameter and an outwardly and upwardly flaring substantially frusto-conical flange portion terminating at an outer peripheral edge of materially greater diameter than the predetermined upper diameter of said base portion with the intermediate relatively elongate and inclined flange portion serving as a feed catcher preventing feed from dropping to an underlying ground or floor surface as poultry withdraw feed from the pan and serving to direct such dropped feed back to the base portion; a hood disposed around and connected to said hollow feed distributing member, said hood being positioned directly above said pan and including a substantially frusto-conically shaped body portion oriented to diverge downwardly away from said member, the lower edge of said body portion including a downwardly extending flange portion; and connection means for securing said pan to said hood, said connection means including spaced elongated spoke members, each of which is connected at one end to the body portion of said hood and at the other end to said flange portion of said pan, a portion of said one end being in juxtaposition with said body portion and said flange portion, the other end of each of said spoke members including a gripping portion adapted to snap securely around a peripheral edge of said flange portion of said pan, each of said spoke members being positioned in a vertical plane which extends at approximately a 45° angle with a second vertical plane passing through the longitudinal axis of said feed conveyance means.

2. A feed dispensing assembly for use in a poultry feeding apparatus having elongated feed conveyance means for directing feed to said assembly, said assembly comprising; a hollow feed distributing member adapted to be secured to and depend from said conveyance means for receiving feed therefrom; a pan disposed beneath said member for receiving said feed and making said feed available to poultry, said pan including a base portion with an upper peripheral edge of predetermined diameter and a flange portion connected to the peripheral edge of said base portion and flaring in substantially frustoconical form outwardly and upwardly from said base portion to an outer peripheral edge of materially greater diameter than the predetermined diameter of the peripheral edge of the base portion with the intermediate elongate and inclined flange portion serving as a feed catcher preventing feed from dropping to an underlying ground or floor surface as poultry withdraw feed from the pan and serving to direct such dropped feed back to the base portion; a hood disposed around and connected to said hollow feed distributing member; and means for connecting said pan to said hood, said connection means including spaced elongated spoke members, each of which is connected at one end to said hood and at the other end to said pan.

3. A feed dispensing assembly according to claim 2 wherein said hood comprises a substantially frustoconical shaped body portion oriented to diverge downwardly and away from said feed distributing member for preventing poultry from perching on said hood.

4. A feed dispensing assembly according to claim 2 wherein said spoke members have their upper ends secured to said hood and depending therefrom, said plurality of spokes having their lower ends resiliently clampingly engaging the outer periphery of said flange to hold said tray in position under said hollow feed distributing member.

5. A feed dispensing assembly according to claim 2 wherein each of said spoke members is positioned in a vertical plane which extends at approximately a 45° angle with a second vertical plane passing through the longitudinal axis of said feed conveyance means.

* * * * *